Dec. 4, 1934.　　　W. F. KIESEL, JR　　　1,983,088
RAILWAY CAR TRUCK
Filed Dec. 17, 1932
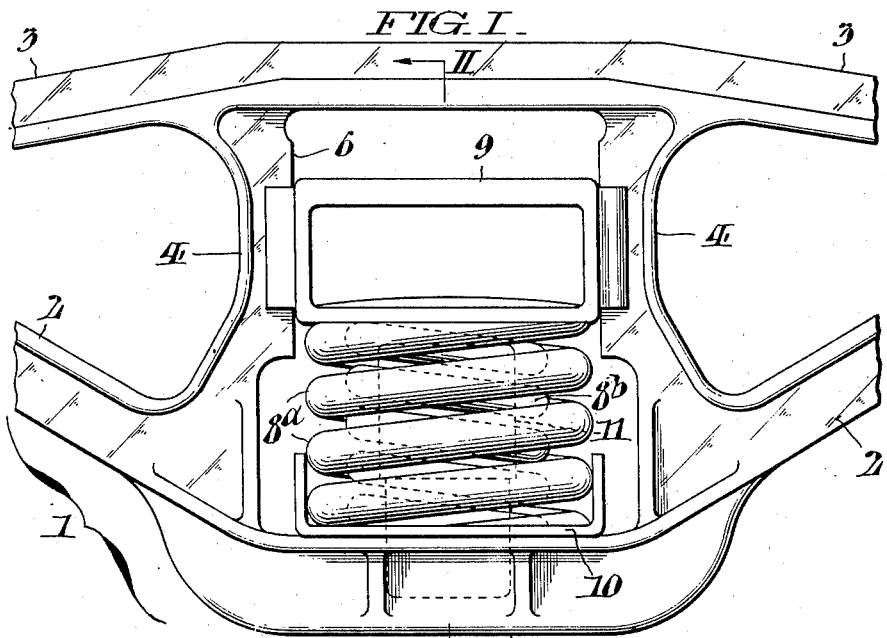
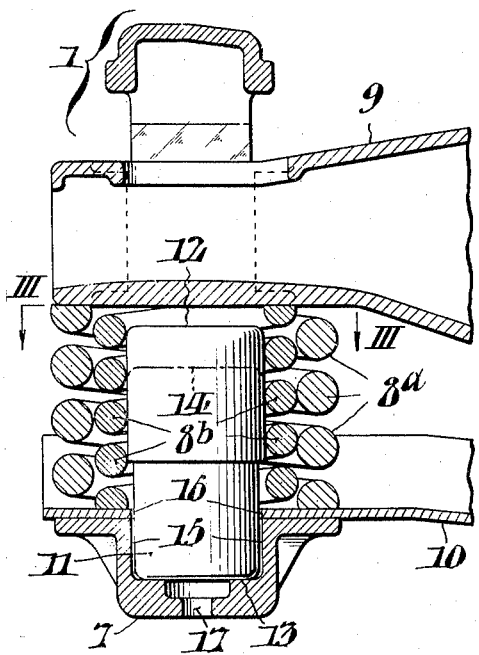
INVENTOR:
William F. Kiesel, Jr., Patented Dec. 4, 1934

1,983,088

UNITED STATES PATENT OFFICE 1,983,088

RAILWAY CAR TRUCK

William F. Kiesel, Jr., Hollidaysburg, Pa.

Application December 17, 1932, Serial No. 647,748

8 Claims. (Cl. 105—197)

This invention relates to railway car trucks, and more especially to the springs and associated parts by which the bolster of a car truck is supported within the truck side frames. Heretofore many schemes have been proposed for increasing the load carrying capacity of freight cars while maintaining easy riding qualities for the car body. Such schemes have for the most part involved radical changes in existing truck design.

The object of the present invention is to provide in a car truck a combination of shock absorbing means of differing characteristics which insures easy riding qualities for the car, under all conditions of loading, and wherein the arrangement is such as to require only a slight departure from present truck construction practice.

A further object of the invention is to provide in combination with the usual truck springs, or like resilient means for supporting the load carrying member, a shock absorbing device which is inactive under light loads, but which under heavy loads comes into play after a predetermined bolster deflection, and then serves adequately to support the load and to maintain proper riding qualities for the car.

A further object of the invention is to provide a truck side frame which in its general characteristics resembles side frames now in use, but which is designed to accommodate a shock absorbing device of greater solid height than the helical springs now customarily used.

Still other objects and advantages characterizing my invention will become more fully apparent from the description hereinafter set forth of one embodiment or example of the practice of the invention, the description having reference to the accompanying drawing. Of the drawing:

Fig. I represents a side elevation of a portion of a side frame of a railway car truck embodying my invention.

Fig. II represents a vertical cross section of the same, taken as indicated by the lines II—II of Fig. I; and, Fig. III represents a horizontal cross section of the same, taken as indicated by the lines III—III of Fig. II.

With reference to the drawing, there is shown a truck having side frames 1 of a common construction, each side frame including tension members 2 and compression members 3. Guide columns 4 define a window 6 at the center of the side frame. The tension members 2 include a spring seat portion 7 upon which helical springs 8a, 8b are mounted. In the present example of my invention, an outer helical spring 8a and an inner helical spring 8b, arranged in concentric relation, are employed. A bolster 9 of customary form is supported at its ends upon the helical springs 8a, 8b, the bolster having capacity for vertical movement within the window 6 of the side frame, and being guided by the guide columns 4. A spring plank 10 joins one side frame 1 with the corresponding side frame at the opposite side of the truck. Each end of the spring plank 10 rests directly upon the spring seat portion 7 of the tension members 2 of the side frame.

For the purpose of adequately supporting the boltser 9 under heavy load conditions, there is provided in addition to the helical springs 8a, 8b a shock absorbing device 11, which may comprise upper and lower movable elements 12, 13 and which may take a great variety of forms. There are many well-known types of snubbers useful for this purpose, and the particular construction of the shock absorbing device 11 forms no part of this invention.

In its normal free position, the shock absorbing device 11 assumes the position shown in Fig. II. The solid height of the shock absorbing device is represented by the dot-and-dash line at 14. It will be apparent that the solid height of the shock absorbing device 11 is greater than the solid height of the helical springs 8a, 8b. In order to accommodate a shock absorbing device having the desired initial free position, the desired capacity, and the desired solid height, the side frame 1 is provided with a depression 15 in the seat portion 7 of the tension members 2. The depression 15 extends downward substantially below the top wall of the seat portion 7 and is constructed in such manner as to accommodate the base 13 of the shock absorbing device with a snug fit. Moreover, in the spring plank 10 there is an opening 16 conforming to the opening at the mouth of the depression 15, and hence the shock absorbing device 11 also serves as a locking pin maintaining the spring plank in proper relation with the seat member 7 of the side frame. Leading downward from the depression 15 through the bottom of the seat portion 7 of the tension members 2, there is an opening 17 useful for the purpose of removing the shock absorbing device 11.

According to the preferred arrangement, the helical coil springs 8a, 8b are arranged in concentric relation with each other as well as in concentric relation with the shock absorbing device 11. However, various other arrangements of the coil springs can obviously be used and are within the contemplation of this invention.

In operation the shock absorbing device 11 functions in the following manner. Under empty car weight the helical coil springs 8a, 8b carry the entire load, and there is clearance between the bottom of the bolster 9 and the top of the shock absorbing device 11. When there is added to the static weight of the car body approximately one quarter of the car load capacity, the bolster engages the top of the shock absorbing device 11; and with heavier loads the shock absorbing device 11 cooperates with the helical coil springs 8a, 8b to give the desired easy riding qualities to the car. Even under excessive loads, the shock absorbing device 11 is of such capacity and of such solid height as to prevent the springs 8a, 8b from going solid, and accordingly even under excessively heavy loads there is still a yielding support for the bolster 9.

The preferred manner of assembling and disassembling the combination of springs and shock absorbing means described above is as follows. The trucks are assembled in inverted position. This is accomplished by inverting the bolster 9 and the side frame 1, then stripping the side frames over the ends of the bolster 9 and dropping the bolster into proper engagement with the guide columns 4 at the windows 6 of the side frames. The helical springs 8a, 8b with the shock absorbing devices 11 assembled centrally thereof, are then introduced above the inverted bolster, after which the spring plank 10 is placed on top of the springs and the shock absorbing device. During this operation wedges, bearings, and axles with wheels thereon, have also been put in place. The truck is then turned over into its normal running position.

When, due to the wear of wheels, bearings, or other parts, it becomes necessary to raise the bolster to bring the car coupler back to its normal position, shims may be introduced between the top of the springs 8a, 8b and the bottom of the bolster 9. As the truck of the present invention is thus assembled, the shock absorbing device 11 expands into the depression 15 at the seat portion 7 of the tension members 2, and forms a secure lock between the side frame 1 and spring plank 10. Moreover, the helical springs 8a, 8b are held by the shock absorbing device 11 against sidewise displacement and cannot be separated from each other.

When it is desired to remove the springs 8a, 8b, or the shock absorbing device 11 while the truck is beneath the car, this can be done in the usual manner by jacking up the bolster 9 until it comes in contact with the top chord formed by the compression member 3 of the side frame. The elements of the shock absorbing device 11, as well as the springs 8a, 8b, may then be removed by first applying a bar through the opening 17 beneath the depression 15 to raise the shock absorbing device above the level of the spring plank 10, and then shifting the spring assembly laterally across the window 6 of the side frame 1.

While I have described one particular example of the practice of my invention, it will be apparent that various changes may be made as to the form and arrangement of the springs, shock absorbing device, and associated parts without departing from the spirit of my invention as defined in the annexed claims.

Having thus described my invention, I claim:

1. In a railway car truck, the combination of a side frame, having a depression in the seat portion thereof, said depression extending downward through and below the upper web of the seat portion, a load carrying member, resilient means for supporting the load carrying member on the seat portion of said side frame, and a shock absorbing device disposed vertically for travel between said load carrying member and the base of said depression, said shock absorbing device being of a greater solid height than that of said resilient means.

2. In a railway car truck, the combination of a side frame, having a depression in the seat portion thereof, said depression extending downward through and below the upper web of the seat portion, a load carrying member, resilient means for supporting the load carrying member on the seat portion of said side frame, and a shock absorbing device adapted to be engaged by said load carrying member, said shock absorbing means being disposed adjacent to said resilient means with its base fitting snugly within the depression aforesaid.

3. In a railway car truck, the combination of a side frame, having a depression in the seat portion thereof, said depression extending downward through and below the upper web of the seat portion, a spring plank resting on said seat portion of the side frame and having an opening therein conforming to said depression, a bolster, resilient means on said spring plank above the seat portion of the side frame for supporting the bolster, and a shock absorbing device for said bolster comprising relatively movable elements disposed vertically adjacent to said resilient means with the lower element fitting snugly within the opening in said spring plank and within the depression in the seat portion of said side frame, and serving as a pin locking the spring plank to said seat portion.

4. In a railway car truck, the combination of a side frame, having a depression in the seat portion thereof, said depression extending downward through and below the upper web of the seat portion, a load carrying member, resilient means for supporting the load carrying member on the seat portion of said side frame, and a shock absorbing device comprising relatively movable elements disposed vertically between said load carrying member and the base of said depression with the lower element fitting snugly within said depression, said shock absorbing device being of a greater solid height than that of said resilient means.

5. In a railway car truck, the combination of a side frame having a tension member affording a spring seat and having a depression in the seat portion of said tension member extending downward through and below the upper web of the tension member, said tension member having an opening leading from said depression through its bottom wall, a bolster, springs for supporting said bolster on the seat portion of said tension member, and a shock absorbing device having its base seated in said depression above the opening aforesaid, said shock absorbing device being adapted to support the bolster when the same is heavily loaded.

6. In a railway car truck, the combination of a side frame having a tension member affording a spring seat and having a depression in the seat portion thereof, a bolster, said depression extending downward through and below the upper web of the seat portion, a helical spring for supporting said bolster on the seat portion of said tension member, and a shock absorbing device disposed vertically between said bolster and the base of said depression in concentric relation within said spring.

7. In a railway car truck, the combination of a side frame having a tension member affording a spring seat and having a depression in the seat portion thereof, a bolster, said depression extending downward through and below the upper web of the seat portion, concentric helical springs for supporting said bolster on the seat portion of said tension member, and a shock absorbing device disposed vertically between said bolster and the base of said depression in concentric relation within said concentric springs.

8. A side frame for a railway car truck having a tension member affording a spring seat, having a centrally positioned depression in the seat portion thereof for accommodating the base of a shock absorbing device, said depression extending downward to the bottom wall of the tension member, and having an opening leading from said depression through the bottom wall of said tension member, through which opening access may be had to the base of said shock absorbing device.

WILLIAM F. KIESEL, Jr.